(12) United States Patent  
Ishibashi et al.

(10) Patent No.: US 8,034,471 B2
(45) Date of Patent: Oct. 11, 2011

(54) MAGNETIC RECORDING MEDIUM, METHOD OF MANUFACTURING MAGNETIC RECORDING MEDIUM AND MAGNETIC RECORDING REPRODUCING APPARATUS

(75) Inventors: Shinichi Ishibashi, Ichihara (JP); Migaku Takahashi, Sendai (JP); Shin Saito, Sendai (JP); Yuzo Sasaki, Ichihara (JP); Atsushi Hashimoto, Chiba (JP); Gohei Kurokawa, Ichihara (JP); Tomoyuki Maeda, Kawasaki (JP); Akihiko Takeo, Tokyo (JP)

(73) Assignees: Showa Denko K.K., Tokyo (JP); Kabushiki Kaisha Toshiba, Tokyo (JP); Tohoku University, Miyagi-ken (JP)

( * ) Notice: Subject to any disclaimer, the term of this patent is extended or adjusted under 35 U.S.C. 154(b) by 0 days.

(21) Appl. No.: 12/536,225

(22) Filed: Aug. 5, 2009

(65) Prior Publication Data

US 2010/0033873 A1    Feb. 11, 2010

(30) Foreign Application Priority Data

Aug. 11, 2008  (JP) ................. 2008-206752

(51) Int. Cl.
*G11B 5/66* (2006.01)

(52) U.S. Cl. .................................... 428/831.2

(58) Field of Classification Search ............. None
See application file for complete search history.

(56) References Cited

U.S. PATENT DOCUMENTS

| 6,858,310 | B2 * | 2/2005 | McGee et al. ............. 428/447 |
| 7,695,832 | B2 * | 4/2010 | Oikawa ....................... 428/831 |
| 2002/0058161 | A1 | 5/2002 | Yamamoto et al. |
| 2004/0057157 | A1 | 3/2004 | Shimizu et al. |
| 2005/0142388 | A1 * | 6/2005 | Hirayama et al. ...... 428/694 TM |
| 2010/0039730 | A1 | 2/2010 | Ishibashi et al. |

FOREIGN PATENT DOCUMENTS

| JP | 2001-006158 A | 1/2001 |
| JP | 2002-109720 A | 4/2002 |
| JP | 2004-046990 A | 2/2004 |
| JP | 2005-190517 A | 7/2005 |

* cited by examiner

*Primary Examiner* — Holly Rickman
(74) *Attorney, Agent, or Firm* — Sughrue Mion, PLLC

(57) ABSTRACT

In a perpendicular magnetic recording medium in which at least a soft magnetic underlayer, an orientation control layer, a magnetic recording layer and a protective layer are formed on a non-magnetic substrate in order from the bottom, the orientation control layer has a laminated structure of two or more layers including an intermediate layer and a seed layer which is disposed closer to the non-magnetic substrate than the intermediate layer. The seed layer includes two or more kinds of elements having a face-centered cubic structure, has face-centered cubic (111) plane crystals oriented in a direction perpendicular to a substrate surface, and has a pseudo-hexagonal structure.

10 Claims, 2 Drawing Sheets

MAGNETIC RECORDING MEDIUM, METHOD OF MANUFACTURING MAGNETIC RECORDING MEDIUM AND MAGNETIC RECORDING REPRODUCING APPARATUS

CROSS REFERENCE TO RELATED APPLICATION

Priority is claimed on Japanese Patent Application No. 2008-206752, filed Aug. 11, 2008, the content of which is incorporated herein by reference

BACKGROUND OF THE INVENTION

1. Field of the Invention

The present invention relates to a magnetic recording medium, a method of manufacturing the magnetic recording medium, and a magnetic recording reproducing apparatus using the magnetic recording medium.

2. Description of the Related Art

In recent years, the range of applications of magnetic recording apparatuses such as magnetic disk drives, flexible disk drives and magnetic tape apparatuses has markedly increased, and the importance of such apparatuses has increased. Also, the recording density of magnetic recording media which are used in such apparatuses is now increasing greatly. In particular, a steeper increase in surface recording density followed the introduction of a magneto-resistive (MR) head and a partial response maximum likelihood (PRML) technique. Also in recent years, the introduction of a giant magneto-resistive (GMR) head and a tunneling magneto-resistive (TuMR) head has led to significant increases in the surface recording density of magnetic recording media.

In addition, there is a demand for achieving a high coercive force, a high signal-to-noise ratio (SNR) and a high resolution of a magnetic recording layer in order to achieve a further increase in the recording density of magnetic recording media in the future.

In a widely used longitudinal magnetic recording system, self-demagnetization, that is, recording magnetic domains adjacent to each other in a transition region of magnetization weakening each other's magnetization, becomes dominant as linear recording density is increased. Accordingly, in the longitudinal magnetic recording system, it is necessary to make a magnetic recording layer thin in order to avoid self-demagnetization and increase shape magnetic anisotropy. However, when the film thickness of a magnetic recording layer is reduced, the magnitude of an energy barrier for maintaining magnetic domains and the magnitude of thermal energy become so close in level to each other that a phenomenon (thermal fluctuation phenomenon) in which the recorded amount of magnetization is relaxed due to the influence of temperature cannot be ignored. This is regarded as a determinant of the linear recording density.

In such circumstances, an anti-ferromagnetic coupling (AFC) medium has recently been proposed as a technique to meet the demand for improving the linear recording density in the longitudinal magnetic recording system, and efforts are being made to avoid the thermal magnetic relaxation problem with longitudinal magnetic recording.

A perpendicular magnetic recording system is attracting attention as a promising technique for achieving a further increase in surface recording density. Whilst a known medium is magnetized in an in-plane direction in the conventional longitudinal magnetic recording system, the perpendicular magnetic recording system is characterized by magnetization in a direction perpendicular to a medium surface. Accordingly, the perpendicular magnetic recording system is thought to be more suitable for high-density recording because it is possible to avoid the influence of self-demagnetization, which is a hindrance to achievement of high linear recording density in the longitudinal magnetic recording system. In addition, the perpendicular magnetic recording system is thought to be comparatively unsusceptible to thermal magnetic relaxation, which is a problem with longitudinal magnetic recording, because it is possible to maintain a certain magnetic layer thickness.

In ordinary cases, when a perpendicular magnetic recording medium which uses a perpendicular magnetic recording system is manufactured, an orientation control layer, a magnetic recording layer, and a protective layer are formed in this order on a non-magnetic substrate. In some cases, a lubricating layer is applied on a surface of the protective layer. Moreover, in general, a soft magnetic film called an underlayer is formed under the orientation control layer. In the orientation control layer, a seed layer and an intermediate layer are laminated in order from the substrate side. The intermediate layer is formed for the purpose of improving the characteristics of the magnetic recording layer. The seed layer is regarded as having the functions of aligning crystals in the intermediate layer and the magnetic recording layer and of controlling the shape of the magnetic crystals.

The crystal structure of the magnetic recording layer is important in order to manufacture a perpendicular magnetic recording medium having excellent characteristics. That is, in many cases, a hexagonal close-packed (hcp) structure is employed as the crystal structure of a magnetic recording layer in a perpendicular magnetic recording medium. However, it is important that a hexagonal close-packed (hcp) (002) crystal plane be parallel to a substrate surface, in other words, that crystal c-axis [002] axes be aligned in the perpendicular direction with as little disturbance as possible.

However, whilst a perpendicular magnetic recording medium has an advantage in that a comparatively thick magnetic recording layer can be used, the total film thickness of all the laminated thin films in the medium tends to increase in comparison with the current longitudinal magnetic recording medium, so there is a disadvantage in that the medium layer laminating process includes a factor responsible for disturbance in the crystal structure.

Conventionally, in order to align crystals in a magnetic recording layer with as little disturbance as possible, Ru, which employs an hcp structure, has been used as an intermediate layer in perpendicular magnetic recording media, in the same way as in a magnetic recording layer. Since crystals in the magnetic recording layer are epitaxially grown on a Ru (002) crystal plane, a magnetic recording medium having excellent crystal orientation is obtained (see, for example, JP-A 2001-6158).

In addition, a seed layer positioned under an intermediate layer is required to improve the crystal orientation of the intermediate layer. For this, a seed layer employing a face-centered cubic (fcc) structure has been used (see, for example, JP-A-2002-109720). In this case, a (002) crystal plane which has an hcp structure in an intermediate layer is preferentially oriented on the orientation of a (111) crystal plane which has an fcc structure. In this manner, the total film thickness for obtaining the same orientation can be reduced more than in the case in which Ru, as an intermediate layer, is directly formed on an underlayer.

JP-A-2005-190517 describes that Ti, Au-50Cu having an hcp structure is used for a first intermediate layer, Ag-40Cu having an fcc structure is used for a second intermediate layer, and Ru is used for a third intermediate layer on an underlayer.

JP-A-2004-46990 describes that a material of a composition employing a C11b structure is used as an orientation control film. As the orientation control film employing the C11b structure, a material including at least one or two or more kinds of Al, Ag, Au, Cu, Ge, Hf, Ni, Si, Ti, Zn and Zr are described.

However, the conventional seed layer is insufficient to obtain a perpendicular magnetic recording medium having excellent recording and reproducing characteristics. A perpendicular magnetic recording medium is desired which is capable of maintaining writing ability at the time of recording by reducing the film thickness between a soft magnetic underlayer and a magnetic recording layer; achieving an improvement in the crystal orientation of the magnetic recording layer and the uniformity and reduction in the crystal grain diameter; and being easily manufactured.

For example, as in JP-A-2002-109720, it is necessary to thickly set the film thickness of a seed layer to a certain thickness (10 nm or greater) in order to improve the crystal orientation of a magnetic recording layer when a material having an hcp structure is used for the seed layer. However, when the seed layer is made of a non-magnetic material and the film thickness of the seed layer is increased, the distance between the magnetic recording layer and a soft magnetic underlayer is increased, thus weakening the attraction of magnetic flux from a recording head at the time of recording and reducing writing ability.

On the other hand, when a material having an fcc structure is used as the seed layer, the crystal orientation of the magnetic recording layer can be improved to a certain level even if the film thickness is about 5 nm. However, when the material having an fcc structure is used as the seed layer, a problem occurs in that the crystal grain diameter of the seed layer is increased along with the improvement in the crystal orientation of the magnetic recording layer. In general, one crystal in an intermediate layer and one crystal in a magnetic recording layer are sequentially grown on one crystal of a seed layer, and thus an increase in the crystal grain diameter of the seed layer means an increase in the crystal grain diameter of the magnetic recording layer. When a crystal grain diameter of the magnetic recording layer is increased, a recording bit transition border is not formed in a smooth straight line and this causes problems when improving recording density. In this manner, when a seed layer having an fcc crystal structure is used, it is difficult to achieve both an improvement in the crystal orientation of a magnetic recording layer and uniformity and reduction in the crystal grain diameter of the magnetic recording layer.

However, in order to further improve surface recording density, it is essential to achieve high crystal c-axis orientation in the magnetic recording layer and uniformity and reduction in the crystal grain diameter of the magnetic recording layer.

SUMMARY OF THE INVENTION

The invention is contrived in view of the above-described circumstances and an object of the invention is to provide a magnetic recording medium capable of maintaining writing ability at the time of recording, achieving both an improvement in the perpendicular orientation of a perpendicular magnetic recording layer and uniformity and reduction in the crystal grain diameter, and recording and reproducing high-density information; and a method of manufacturing the magnetic recording medium.

In addition, another object of the invention is to provide a magnetic recording reproducing apparatus which includes the magnetic recording medium of the invention and has excellent high recording density characteristics.

In order to achieve the objects, the invention employs the following configurations.

(1) A perpendicular magnetic recording medium in which at least a soft magnetic underlayer, an orientation control layer, a magnetic recording layer and a protective layer are formed on a non-magnetic substrate in order from the bottom. The orientation control layer has a laminated structure of two or more layers including an intermediate layer and a seed layer which is disposed closer to the non-magnetic substrate than the intermediate layer, and the seed layer includes two or more kinds of elements having a face-centered cubic structure, has face-centered cubic crystal structure which (111) plane is oriented in a direction perpendicular to a substrate surface, and has a pseudo-hexagonal structure.

(2) The magnetic recording medium according to (1), in which the two or more kinds of element having a face-centered cubic structure are selected from the group consisting of Cu, Ag, Au, Ni, Pd, Pt, Ir, Al, Rh, Pb and Co.

(3) The magnetic recording medium according to (1) or (2), in which a film thickness of the seed layer is equal to or greater than 3 nm and equal to or less than 10 nm.

(4) The magnetic recording medium according to any one of (1) to (3), in which the underlayer has a soft magnetic amorphous structure.

(5) The magnetic recording medium according to any one of (1) to (4), in which the intermediate layer includes an alloy layer made of Ru, Re or an alloy thereof and having a hexagonal close-packed structure.

(6) The magnetic recording medium according to any one of (1) to (4), in which the intermediate layer includes an alloy layer, which is made of an alloy including at least one kind of element selected from elements having an fcc structure as a main component and an element selected from elements having a body-centered cubic structure and has both a crystal structure with (111) crystal plane orientation and a layered irregular lattice resulting from the mix of the face-centered cubic structure and the body-centered cubic structure.

(7) The magnetic recording medium according to any one of (1) to (4), in which the intermediate layer includes an alloy layer, which is made of an alloy material including at least one kind of element selected from elements having an fcc structure as a main component and an element selected from elements having a hexagonal close-packed structure and has both a crystal structure with (111) crystal plane orientation and a layered irregular lattice resulting from the mix of the fcc structure and the hexagonal close packed structure.

(8) The magnetic recording medium according to any one of (1) to (7), in which the magnetic recording layer has a granular structure formed of a ferromagnetic crystal grain and a crystal grain boundary of non-magnetic oxide, and includes a granular layer, the average grain diameter of which is equal to or less than 7.5 nm in a crystal grain diameter analysis by a transmission electron microscope.

(9) The magnetic recording medium according to any one of (1) to (8), in which the seed layer is made of alloy including Ag and Cu, and the content of Ag is in the range of 30 to 80 at % and the content of Cu is in the range of 20 to 70 at %.

(10) The magnetic recording medium according to any one of (1) to (8), in which the seed layer is made of an alloy including Ag and Au, and the content of Ag is in the range of 20 to 70 at % and the content of Au is in the range of 30 to 80 at %.

(11) The magnetic recording medium according to any one of (1) to (8), in which the seed layer is made of an alloy including Au and Cu, and the content of Au is in the range of 30 to 80 at % and the content of Cu is in the range of 20 to 70 at %.

(12) A method of manufacturing a magnetic recording medium, including: forming at least a soft magnetic underlayer, an orientation control layer, a magnetic recording layer and a protective layer on a non-magnetic substrate in order from the bottom. The orientation control layer has a laminated structure of two or more layers including an intermediate layer and a seed layer which is disposed closer to the non-magnetic substrate than the intermediate layer, and forming the seed layer is a step of forming the seed layer including two or more kinds of elements having a face-centered cubic structure, having face-centered cubic (111) plane crystals oriented in a direction perpendicular to a substrate surface, and having a pseudo-hexagonal structure.

(13) A magnetic recording reproducing apparatus including: the magnetic recording medium according to any one of (1) to (11); and a magnetic head for recording information on the magnetic recording medium and reproducing the information from the magnetic recording medium.

In the magnetic recording medium of the invention, the orientation control layer has a laminated structure of two or more layers including the intermediate layer and the seed layer which is disposed closer to the non-magnetic substrate than the intermediate layer. The seed layer includes two or more kinds of elements having a face-centered cubic (fcc) structure, has face-centered cubic (fcc) (111) plane crystals oriented in a direction perpendicular to a substrate surface, and has a pseudo-hexagonal structure. Accordingly, the seed layer has a uniform and small crystal grain diameter, and has excellent crystal orientation even if a film thickness is thin.

Accordingly, the orientation of the intermediate layer and the magnetic recording layer disposed on the seed layer in the magnetic recording medium of the invention is controlled by the seed layer, and thus the intermediate layer and the magnetic recording layer have a uniform and small crystal grain diameter and have excellent crystal orientation.

As a result, according to the magnetic recording medium of the invention, it is possible to improve the crystal orientation of the magnetic recording layer. Specifically, for example, when the crystal structure of the magnetic recording layer is an hcp structure, a crystal c-axis is perpendicularly oriented with respect to a substrate surface without disturbance in a small angle dispersion state. Further, since the magnetic recording layer has a uniform and small crystal grain diameter, a recording bit transition border is formed in a smooth straight line and excellent high recording density characteristics are obtained. Moreover, according to the magnetic recording medium of the invention, the crystal orientation of the intermediate layer and the magnetic recording layer is excellent even if the thickness of the orientation control layer is made thin. Accordingly, the film thickness between the soft magnetic underlayer and the magnetic recording layer can be controlled by making the orientation control layer thin. Therefore, when a recording magnetic field is applied by a recording head, magnetic flux from the recording head is efficiently attracted to the magnetic recording layer and the writing ability of the recording head at the time of recording can thus be improved.

DETAILED DESCRIPTION OF THE INVENTION

Hereinafter, the invention will be described in detail with reference to the drawings.

[Magnetic Recording Medium]

Figure 1:
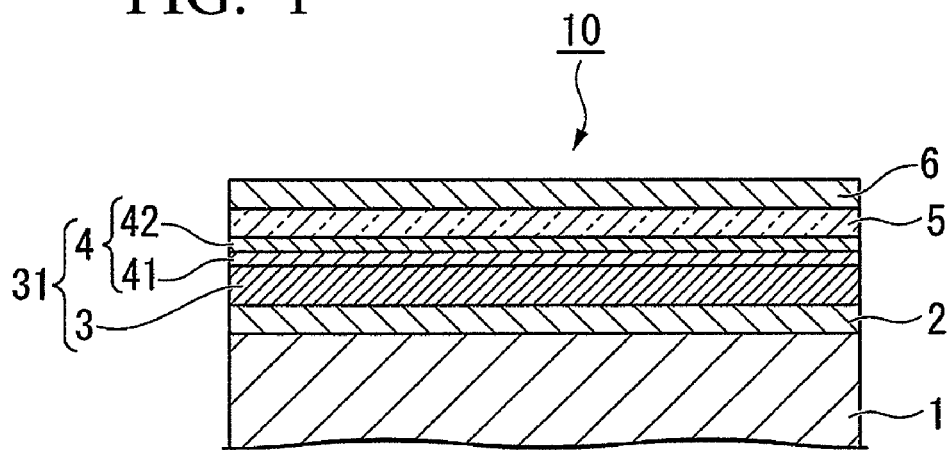
FIG. 1 is a longitudinal sectional view illustrating a perpendicular magnetic recording medium which is an example of a magnetic recording medium of the invention.

FIG. 1 is a longitudinal sectional view illustrating a perpendicular magnetic recording medium which is an example of a magnetic recording medium of the invention. A perpendicular magnetic recording medium 10 illustrated in FIG. 1 is made so that at least a soft magnetic underlayer 2, an orientation control layer 31, a magnetic recording layer 5 and a protective layer 6 are formed on a non-magnetic substrate 1 in order from the bottom.

As the non-magnetic substrate 1, any non-magnetic substrate, such as an Al alloy substrate including Al as a main component, e.g., Al—Mg alloy and a substrate made of general soda glass, aluminosilicate-based glass, amorphous glass, silicon, titanium, ceramics, sapphire, quartz or any of various resins can be used. Among these, it is preferable to use an Al alloy substrate or a glass substrate made of crystallized glass, amorphous glass or the like. In the case of a glass substrate, a mirror-polished substrate, a low-Ra substrate, the surface roughness Ra of which is less than 1 Å, or the like is preferably used. The non-magnetic substrate 1 may have a texture if it is insignificant. In addition, a size of the substrate which is used as the non-magnetic substrate 1 can be arbitrarily determined depending on the intended use and is not particularly limited.

Next, the layers formed on the non-magnetic substrate 1 will be described.

The soft magnetic underlayer 2 has the function of introducing a recording magnetic field from a recording head to efficiently apply a perpendicular component of the recording magnetic field to the magnetic recording layer 5 at the time of recording a signal on the magnetic recording medium 10.

As a material for the soft magnetic underlayer 2, a material having soft magnetic characteristics, such as FeCo-based alloy, CoZrNb-based alloy or CoTaZr-based alloy, may be used.

The soft magnetic underlayer 2 may be formed of a single soft magnetic layer. Otherwise, the soft magnetic underlayer may have an anti-ferromagnetic coupling (AFC) structure in which an extremely thin non-magnetic film made of Ru or the like is interposed between two soft magnetic layers.

In addition, it is preferable that the soft magnetic underlayer 2 have a soft magnetic amorphous structure. Since the surface roughness Ra of the magnetic recording medium 10 can be suppressed at a low level by employing a soft magnetic amorphous structure as the structure of the soft magnetic underlayer 2, the amount of floating of the head can be reduced and the recording density can be further increased.

The total film thickness of the soft magnetic underlayer 2 is set in the range of about 10 to 50 nm and is arbitrarily determined depending on the balance between recording and reproducing characteristics and over-write (OW) characteristics.

In the perpendicular magnetic recording medium 10 illustrated in FIG. 1, the orientation control layer 31, which controls the orientation of the magnetic recording layer 5 which is a film located immediately above the orientation control layer, is formed on the soft magnetic underlayer 2. The orientation control layer 31 has a laminated structure of two or more layers including an intermediate layer 4 and a seed layer 3 which is disposed closer to the non-magnetic substrate 1 than the intermediate layer 4.

The seed layer 3 is a layer for controlling the crystal orientation of the intermediate layer 4 disposed on the seed layer 3 and the magnetic recording layer 5 disposed on the intermediate layer 4, and controlling the crystal grain diameter of the intermediate layer 4 and the magnetic recording layer 5. The seed layer 3 may be formed of a single layer or two or more layers laminated with each other.

In the perpendicular magnetic recording medium 10 illustrated in FIG. 1, at least one layer in the seed layer 3 (in this embodiment, one layer) includes two or more kinds of elements having an fcc structure, has an fcc structure which (111) crystal plane is oriented in a direction perpendicular to a substrate surface, and has a pseudo-hexagonal structure. Due to this seed layer 3, smaller crystal grains can be formed on the soft magnetic underlayer 2 and a smaller crystal grain diameter can be maintained even when the film thickness is thicker than in the case in which the seed layer is formed of a material only having an fcc structure.

Herein, using an alloy which has an fcc structure which (111) crystal plane is oriented in a direction perpendicular to a substrate surface and has a pseudo-hexagonal structure means that in in-plane X-ray diffraction, not only a diffraction peak from an fcc (220) plane corresponding to the fcc (111) plane crystal orientation in the direction perpendicular to the substrate surface is observed, but also another diffraction peak rather than the peak from the fcc (220) plane is observed at a low diffraction angle side of the peak from the fcc (220) plane.

In general, in the case of an alloy having a hexagonal close packed (hcp) structure, a diffraction peak corresponding to a hexagonal close packed (hcp) (110) plane and a peak corresponding to an hcp (100) plane are observed in the in-plane X-ray diffraction. Herein, it is assumed that a diffraction peak from an fcc (220) plane in the alloy constituting the seed layer 3 is a diffraction peak corresponding to a hexagonal close packed (hcp) (110) plane and another diffraction peak at a low diffraction angle side is a peak corresponding to an hcp (100) plane. Where such an assumption is made, when the alloy constituting the seed layer 3 has the diffraction peak (diffraction peak of hcp (110) plane) from the fcc (220) plane and another diffraction peak (diffraction peak of hcp (100) plane) at the low angle side, it can be regarded that the seed layer 3 has a hexagonal close packed (hcp) structure in which hcp (002) plane crystals are oriented (in other words, fcc structure which (111) crystal plane is oriented in the direction perpendicular to the substrate surface).

The alloy having a pseudo-hexagonal structure means the alloy which shows a property similar to an alloy having a hexagonal close packed (hcp) structure in in-plane X-ray diffraction, that is, two peaks which correspond to the diffraction peak from an hcp (110) plane and the peak from an hcp (100) plane in the case of the hexagonal close packed (hcp) structure are observed at different diffraction angles, however, which does not show a hcp structure in a state diagram of the bulk material of the alloy.

It is preferable that at least one layer in the seed layer 3 includes two or more kinds of elements having an fcc structure; the layer has fcc structure which (111) crystal plane is oriented in a direction perpendicular to a substrate surface; and the layer not only shows a peak from the fcc (220) plane in in-plane X-ray diffraction, but also shows a peak at a low diffraction angle side of the peak from the fcc (220).

It is preferable that the alloy constituting the seed layer 3 include as its main components two or more kinds of elements which are selected from the group consisting of Cu, Ag, Au, Ni, Pd, Pt, Ir, Al, Rh, Pb and Co, and it is more preferable that the alloy be an alloy including Ag and Cu, an alloy including Ag and Au or an alloy including Au and Cu.

When the seed layer 3 is made of an alloy including Ag and Cu, it is preferable that Ag be included in the range of 30 to 80 at % and Cu be included in the range of 20 to 70 at %.

When the seed layer 3 is made of an alloy including Ag and Au, it is preferable that Ag be included in the range of 20 to 70 at % and Au be included in the range of 30 to 80 at %.

When the seed layer 3 is made of an alloy including Au and Cu, it is preferable that Au be included in the range of 30 to 80 at % and Cu be included in the range of 20 to 70 at %.

The film thickness of the seed layer 3 is preferably equal to or greater than 3 nm and equal to or less than 10 nm, and more preferably equal to or greater than 3 nm and equal to or less than 6 nm. When the film thickness of the seed layer 3 exceeds the above range, the distance between the recording head and the soft magnetic underlayer 2 is too great and thus sufficient signal writing ability cannot be obtained during the recording of information on the magnetic recording medium 10 in some cases. When the film thickness of the seed layer 3 is less than the above range, the crystal orientation of the seed layer 3 deteriorates and thus sufficient crystal orientation of the magnetic recording layer 5 is not obtained in some cases. When the film thickness of the seed layer 3 is set in the above range, the seed layer 3 has an fcc structure which (111) crystal plane is orientated in the direction perpendicular to the substrate surface and has the pseudo-hexagonal structure. Accordingly, it is possible to easily control the crystal orientation of the intermediate layer 4 and the magnetic recording layer 5 and make the crystal grain diameter of the intermediate layer 4 and the magnetic recording layer 5 both uniform and small.

The intermediate layer 4 is a layer for controlling the crystal orientation of the magnetic recording layer 5 disposed on and adjacent to the intermediate layer 4 and controlling the crystal grain diameter of the magnetic recording layer 5. The crystal orientation of the magnetic recording layer 5 is substantially determined depending on the crystal orientation of the intermediate layer 4. In this embodiment, since the combination of the crystal grains constituting the intermediate layer 4 is suppressed, each single crystal grain of the magnetic recording layer 5 is epitaxially grown on one of the crystal grains constituting the intermediate layer 4.

The intermediate layer 4 may be formed of a single layer or two or more layers laminated with each other. In the perpendicular magnetic recording medium 10 illustrated in FIG. 1, the intermediate layer 4 is formed of two layers, that is, a first intermediate layer 41 which is formed close to the substrate and a second intermediate layer 42 which is formed on the first intermediate layer 41 and adjacent to the magnetic recording layer 5. Since the intermediate layer 4 is formed of the two layers, that is, the first intermediate layer 41 and the second intermediate layer 42, the intermediate layer 4 can be disposed adjacent to the seed layer 3 and the magnetic recording layer 5, respectively.

It is preferable that the first intermediate layer 41 be formed of an alloy layer made of Ru, Re or an alloy thereof and having an hcp structure.

In addition, the first intermediate layer 41 may be formed of an alloy layer, which is made of an alloy including at least one kind of element selected from elements having an fcc structure as a main component and an element selected from elements having a body-centered cubic (bcc) structure, and has both a crystal structure with (111) crystal plane orientation and a layered irregular lattice (stacking fault) resulting from the mix of the fcc structure and the bcc structure. Examples of such an alloy layer include an alloy layer made of an alloy including Pt (fcc) and W (bcc) at a ratio of 50 to 50, an alloy layer made of an alloy including Au (fcc) and Mo (bcc) at a ratio of 60 to 40 and the like.

Moreover, the first intermediate layer 41 may be formed of an alloy layer, which is made of an alloy material including at least one kind of element selected from elements having an fcc structure as a main component and an element selected from an element group having an hcp structure, and has both a crystal structure with (111) crystal plane orientation and a layered irregular lattice (stacking fault) resulting from the mix of the fcc structure and the hcp structure. Examples of such an alloy layer include an alloy layer made of an alloy including Ir (fcc) and Re (hcp) at a ratio of 50 to 50 and the like.

When the first intermediate layer 41 is formed of one of the alloy layers, the first intermediate layer 41 has excellent crystal orientation and small crystal grains, which is preferable.

In order to improve the crystal orientation and suppress the combination of the crystal grains, the film thickness of the first intermediate layer 41 is preferably equal to or greater than 1 nm and equal to or less than 15 nm, and more preferably equal to or greater than 5 nm and equal to or less than 10 nm.

It is preferable that the second intermediate layer 42 be formed of a material made of Ru or an alloy thereof and employing an hcp structure or an fcc structure. Moreover, it is preferable that the second intermediate layer 42 be formed of a material in which a grain boundary of oxide or nitride surrounds a crystal grain. In this case, the combination of the crystal grains is suppressed and a grain boundary width is thick, so the crystal grains are reduced, which is preferable.

Literally, the magnetic recording layer 5 is a magnetic layer on which signal recording is actually performed, and the final recording and reproducing characteristics of the magnetic recording medium 10 are determined depending on the crystal structure and magnetic properties of the magnetic recording layer 5. The magnetic recording layer 5 is a layer in which an axis of easy magnetization (crystal c-axis) is oriented mainly in the direction perpendicular to the substrate surface. In many cases, in the perpendicular magnetic recording medium, the crystal structure of the magnetic recording layer 5 employs an hcp structure, and it is important that the (002) crystal plane thereof is parallel to the substrate surface, that is to say, the crystal c-axis [002] axes are aligned in the perpendicular direction with as little disturbance as possible.

A method of evaluating the alignment of the crystal c-axis [002] axes in the magnetic recording layer 5 can use a half-value width of a rocking curve. In order to obtain the half-value width of the rocking curve, first, an X-ray diffraction apparatus is used to analyze the crystal plane parallel to the substrate surface of the film formed on the substrate.

For example, when the film formed on the substrate is a film having an hcp structure such as the above-described magnetic recording layer 5, a diffraction peak corresponding to a crystal plane thereof is observed. For example, in the case of a perpendicular magnetic recording medium in which a Co-based alloy is used as the magnetic recording layer 5, a c-axis [002] direction of the hcp structure is oriented so as to be perpendicular to a substrate surface, and thus a peak corresponding to an hcp (002) crystal plane is observed. Next, while maintaining a Bragg angle at which diffraction occurs on the hcp (002) crystal plane, an optical system of the X-ray diffraction apparatus is swung with respect to the substrate surface. At this time, when plotting the diffraction intensity of the hcp (002) crystal plane with respect to the angle at which the optical system is tilted, one diffraction peak can be drawn. This is called a rocking curve.

When the hcp (002) crystal plane is well-arranged parallel to the substrate surface, a sharp rocking curve is obtained. However, when the orientation of the hcp (002) crystal plane is widely dispersed, a broad curve is obtained. Accordingly, a half-value width $\Delta\theta 50$ of the rocking curve can be used as an index for judging whether the crystal orientation of the magnetic recording layer is good or not. That is, it can be judged that the smaller the value of the half-value width $\Delta\theta 50$ of the rocking curve the better the crystal c-axis [002] axes of the magnetic recording layer are arranged and oriented perpendicular to the substrate surface.

In the invention, since the crystal orientation of the magnetic recording layer 5 is controlled depending on the seed layer 3 and the intermediate layer 4, a magnetic recording layer with a small half-value width $\Delta\theta 50$ of the rocking curve is easily obtained.

An example of a material for the magnetic recording layer 5 includes a Co-based alloy thin film of CoCr, CoCrPt, CoCrPtB, CoCrPtB-X, CoCrPtB-X-Y, CoCrPt—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt—$B_2O_3$, CoCrPt—$WO_2$, CoCrPt—$WO_3$ or the like.

The magnetic recording layer 5 may be formed of a single layer or two or more layers laminated with each other. In addition, it is preferable that the magnetic recording layer have a granular structure formed of a ferromagnetic crystal grain and a crystal grain boundary of non-magnetic oxide, and include a granular layer, the average grain diameter of which is equal to or less than 7.5 nm in a crystal grain diameter analysis by a transmission electron microscope (TEM). In particular, when the magnetic recording layer 5 has a granular structure in which oxide surrounds a ferromagnetic Co crystal grain, the magnetic interaction between the Co crystal grains is weakened and noise of the magnetic recording layer 5 can be reduced, which is preferable.

The smaller the average grain diameter of the granular layer is, the more preferable it is. When the average grain diameter of the granular layer is equal to or less than 7.5 nm, a recording bit transition border is formed in a smooth straight line and high recording density characteristics of increased excellence are obtained.

The protective layer 6 is a layer for protecting the medium from the damage caused by the contact between the head and the medium. A carbon film, a $SiO_2$ film or the like is used as the protective layer 6. A carbon film is preferably used because it has an excellent protective performance. The film thickness of the protective layer 6 is set in the range of about 1 to 10 nm, preferably in the range of about 2 to 6 nm, and more preferably in the range of about 2 to 4 nm.

A lubricating layer formed of a fluorine-based lubricant, a hydrocarbon-based lubricant, a mixture thereof or the like may be formed on the protective layer 6.

Since the magnetic recording medium of the invention obtains excellent high recording density characteristics, it can be applied to a medium which is expected to be further improved in recording density, for example, an exchange-coupled composite (ECC) medium or a new perpendicular recording medium such as discrete track media or patterned media.

[Magnetic Recording Medium Manufacturing Method]

Next, a method of manufacturing the perpendicular magnetic recording medium illustrated in FIG. 1 will be described as an example of a method of manufacturing the magnetic recording medium of the invention.

First, the non-magnetic substrate 1 is cleaned and dried in order to manufacture the perpendicular magnetic recording medium illustrated in FIG. 1. By cleaning and drying the non-magnetic substrate 1, adhesion of each layer formed on the non-magnetic substrate 1 can be sufficiently ensured. Herein, examples of a cleaning method include cleaning with water and cleaning by etching (inverse sputtering).

Next, the soft magnetic underlayer 2, the orientation control layer 31 (intermediate layer 4 and seed layer 3) and the magnetic recording layer 5 are formed on the non-magnetic substrate 1 in order from the bottom. In general, the soft magnetic underlayer 2, the orientation control layer 31 and the magnetic recording layer 5 are formed by DC magnetron sputtering or RF sputtering. However, sputtering using an RF bias, a DC bias, a pulse DC, a pulse DC bias or the like may be used. Examples of a sputtering gas which is used in the sputtering include a Kr gas, an $O_2$ gas, $H_2O$ gas, $H_2$ gas, $N_2$ gas and the like.

When the seed layer 3 is formed by sputtering, a sputtering gas pressure is preferably set in the range of 0.4 to 0.8 Pa to have excellent crystal orientation.

The sputtering gas pressure is arbitrarily determined to be optimum for each layer. In general, the sputtering gas pressure is set in the range of about 0.1 to 30 Pa.

Specifically, for example, for the intermediate layer 4 having the largest influence on the crystal orientation of the magnetic recording layer 5, it is preferable that the sputtering gas pressure at the time of forming the first intermediate layer 41, which is an initial stage for forming the intermediate layer 4, be reduced to be less than 1 Pa in order to improve the crystal orientation.

However, when the intermediate layer is continuously grown with the reduced sputtering gas pressure, crystal grains are combined with each other during the film formation. When the crystals of the magnetic recording layer 5 are epitaxially grown on the combined crystal grains, the crystal grain diameter of one crystal of the magnetic recording layer 5 is increased up to about the diameter of the combined crystal grains of the intermediate layer 4.

Accordingly, it is preferable that the sputtering gas pressure at the time of film formation be increased to 1.5 Pa or greater for the second intermediate layer 42 of the intermediate layer 4. By increasing the sputtering gas pressure at the time of forming the second intermediate layer 42 to 1.5 Pa or greater, it is possible to keep a space between the crystal grains and suppress the combination of the crystal grains.

In this manner, the intermediate layer 4 which has an excellent orientation control property can be formed by setting the sputtering gas pressure for the first intermediate layer 41 to 1 Pa or less and setting the sputtering gas pressure for the second intermediate layer 42 to 1.5 Pa or greater.

Sputtering, a plasma CVD method, a magnetron plasma CVD method or the like is used to form the protective layer 6. If necessary, a lubricating layer is formed by applying a lubricant on the protective layer 6.

In this manner, the magnetic recording medium 10 illustrated in FIG. 1 is obtained.

[Magnetic Recording Reproducing Apparatus]

Next, embodiments of a magnetic recording reproducing apparatus of the invention will be described.

Figure 2:
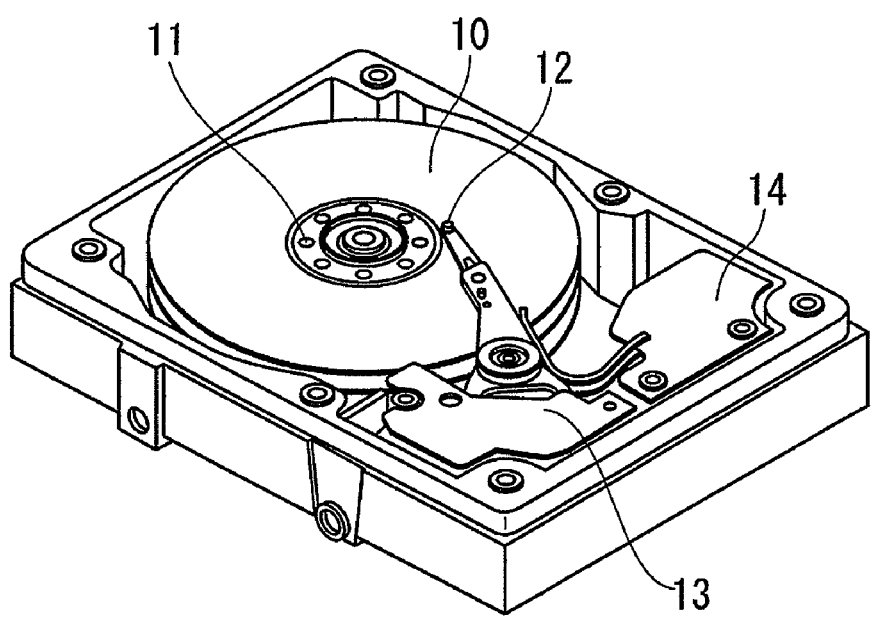
FIG. 2 is a schematic configuration diagram illustrating an example of a magnetic recording reproducing apparatus of the invention.

FIG. 2 is a schematic configuration diagram illustrating an example of the magnetic recording reproducing apparatus of the invention. The magnetic recording reproducing apparatus illustrated in FIG. 2 includes the magnetic recording medium 10 illustrated in FIG. 1, a medium driving portion 11 for rotationally driving the magnetic recording medium 10, a magnetic head 12 for recording information on the magnetic recording medium 10 and reproducing the information from the magnetic recording medium 10, a head driving portion 13 for moving the magnetic head 12 in relation to the magnetic recording medium 10, and a recording and reproducing signal processing system 14.

The recording and reproducing signal processing system 14 processes data input from the outside to generate a recording signal and input the recording signal to the magnetic head 12, and processes a reproducing signal from the magnetic head 12 to generate data and output the data to the outside.

As the magnetic head 12 which is used in the magnetic recording reproducing apparatus of the invention, a magnetic head suitable for high recording density and having an AMR element using an anisotropic magnetoresistive (AMR) effect, a GMR element using a giant magnetoresistive (GMR) effect, a TuMR element using a tunneling effect or the like as a reproducing element can be used.

The magnetic recording reproducing apparatus illustrated in FIG. 2 includes the magnetic recording medium 10 having the configuration illustrated in FIG. 1. Since the magnetic recording layer of the magnetic recording medium 10 is substantially perpendicularly oriented at a high level, and the magnetic grains in the magnetic recording layer have a uniform and small grain diameter, excellent recording and reproducing characteristics can be obtained in the high-density recording region. Further, since the film thickness of the seed layer of the magnetic recording medium 10 can be comparatively thinly set, it is possible to efficiently apply a recording magnetic field from a recording head to the magnetic recording layer and reliably write information.

EXAMPLES

After a soft magnetic underlayer made of amorphous 88(65Fe-35Co)-12B having a thickness of 10 nm was formed on a glass substrate by sputtering, metal layers made of Ag (Ag: 100 at %), Cu (Ag: 0 at %), Ag—Cu alloy (Ag: 30 at %), Ag—Cu alloy (Ag: 50 at %), and Ag—Cu alloy (Ag: 70 at %) were formed by sputtering and in-plane X-ray diffraction was performed. The result thereof is illustrated in FIG. 3.

Figure 3:
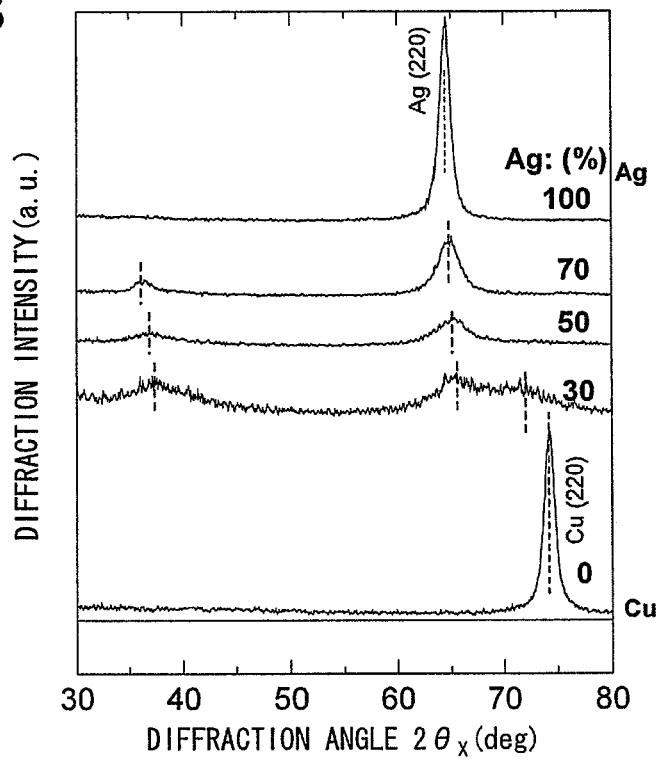
FIG. 3 is a graph illustrating in-plane X-ray diffraction profiles of Ag—Cu alloy.

FIG. 3 is a graph illustrating in-plane X-ray diffraction profiles of the Ag—Cu alloy.

As illustrated in FIG. 3, in the case of the profiles of the Ag (Ag: 100 at %) and the Cu (Ag: 0 at %), only a peak from an fcc (220) plane is observed. In the case of the profiles of the Ag—Cu alloy (Ag: 30 at %), the Ag—Cu alloy (Ag: 50 at %) and the Ag—Cu alloy (Ag: 70 at %), a peak from an fcc (220) plane at a high angle side and another peak at a low angle side are observed. From this, it was possible to confirm that the Ag—Cu alloy (Ag: 30~70 at %) has an fcc structure which (111) crystal plane is oriented in a direction perpendicular to a substrate surface, and has a pseudo-hexagonal structure.

Figure 4:
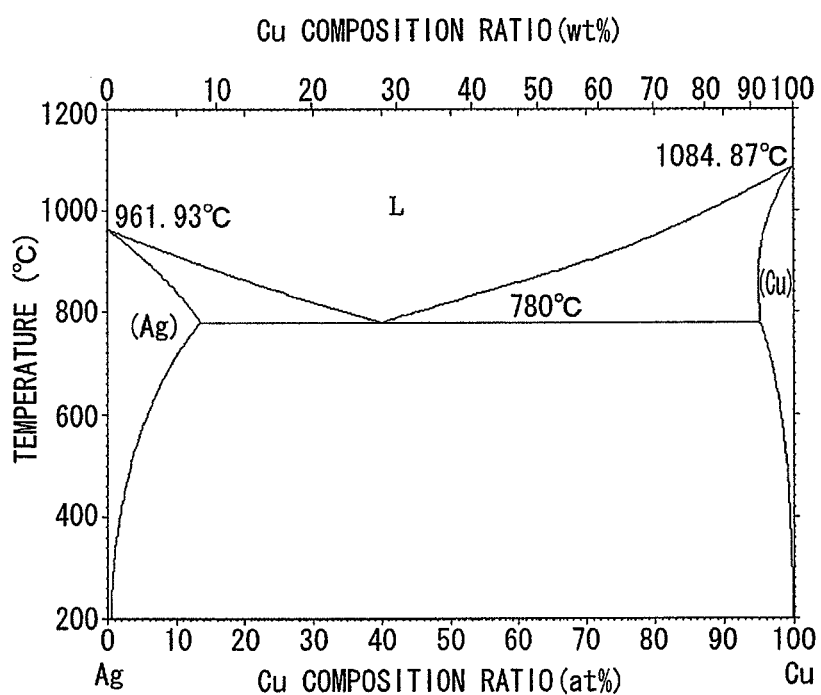
FIG. 4 is a state diagram of Ag—Cu alloy in a bulk state.

FIG. 4 is a state diagram of the Ag—Cu alloy in a bulk state. In the Ag—Cu alloy (Ag: 30~70 at %) which has the fcc structure which (111) crystal plane is oriented (hcp (002) orientation) in the direction perpendicular to the substrate surface, illustrated in FIG. 3, there is no phase of a hexagonal close packed (hcp) structure as illustrated in FIG. 4. Accordingly, it was found that the Ag—Cu alloy (Ag: 30~70 at %) has the pseudo-hexagonal structure.

Examples 1 to 9 and Comparative Examples 1 to 3

An HD glass substrate was set in a vacuum chamber in a sputtering apparatus and the inside of the vacuum chamber was evacuated to $1.0 \times 10^{-5}$ Pa or less.

Next, an Ar atmosphere was applied in the vacuum chamber and a 50-nm thick soft magnetic underlayer made of Co10Ta5Zr was formed on the glass substrate at a gas pressure of 0.6 Pa by sputtering.

Next, in the Ar atmosphere, seed layers having the compositions and film thicknesses shown in Table 1 were formed on the soft magnetic underlayer at a gas pressure of 0.6 Pa by sputtering.

The in-plane X-ray diffraction of the seed layers obtained in this manner was performed and the structures of the seed layers were analyzed. The result thereof is shown in Table 1.

Subsequently, in the Ar atmosphere, a 5-nm thick first intermediate layer made of Ru was formed on the seed layer at a gas pressure of 0.6 Pa by sputtering. After that, in the Ar atmosphere, a 15-nm thick second intermediate layer made of Ru was formed on the first intermediate layer at a gas pressure of 5 Pa by sputtering.

Next, in the Ar atmosphere, a 12-nm thick magnetic recording layer made of 90(Co10Cr20Pt)-10(SiO$_2$) was formed on the second intermediate layer at a gas pressure of 5 Pa by sputtering. Subsequently, a 4-nm thick protective layer formed of a carbon film was formed on the magnetic recording layer and a lubricating layer was formed by applying a tetraol lubricant on the protective layer. In this manner, a perpendicular magnetic recording medium was manufactured.

In the alloy composition formulas of Examples 1 to 9 and Comparative Examples 1 to 3, double-byte numeric characters attached before each element indicate the ratio (at %) of each element included in the alloy, and the ratio of an element without numeric characters is a remainder of the ratio of another element.

For the perpendicular magnetic recording media of Examples 1 to 9 and Comparative Examples 1 to 3 obtained in this manner, the recording and reproducing characteristics, static magnetic characteristics, crystal orientation of the magnetic recording layer and average crystal grain diameter were evaluated as follows. The result thereof is shown in Table 1.

[Recording and Reproducing Characteristics]

The magnetic recording media were evaluated by measuring an SNR by using a read-write analyzer 1632 and a spin-stand S1701MP manufactured by GUZIK Technical Enterprises.

[Static Magnetic Characteristics]

The magnetic recording media were evaluated by measuring a coercive force Hc by using a Kerr measuring apparatus.

TABLE 1

| Sample | Seed Layer (at %) | Structure of Seed Layer | Film Thickness (nm) | SNR (dB) | Hc (Oe) | Δθ50 (deg.) | Average Crystal Grain Diameter (nm) |
|---|---|---|---|---|---|---|---|
| Example 1 | Ag30Cu | Pseudo-hexagonal Structure | 5 | 17.3 | 4029 | 3.4 | 6.6 |
| Example 2 | Ag50Cu | Pseudo-hexagonal Structure | 5 | 17.3 | 4054 | 3.3 | 6.6 |
| Example 3 | Ag70Cu | Pseudo-hexagonal Structure | 5 | 17.1 | 3892 | 3.4 | 6.8 |
| Example 4 | Ag30Au | Pseudo-hexagonal Structure | 5 | 17.5 | 3829 | 3.0 | 6.2 |
| Example 5 | Ag50Au | Pseudo-hexagonal Structure | 5 | 17.6 | 3872 | 3.3 | 6.4 |
| Example 6 | Ag70Au | Pseudo-hexagonal Structure | 5 | 17.3 | 3921 | 3.2 | 6.4 |
| Example 7 | Au30Cu | Pseudo-hexagonal Structure | 5 | 17.2 | 4102 | 3.1 | 6.4 |
| Example 8 | Au50Cu | Pseudo-hexagonal Structure | 5 | 17.1 | 4026 | 3.1 | 6.6 |
| Example 9 | Au70Cu | Pseudo-hexagonal Structure | 5 | 17.3 | 4172 | 3.0 | 6.5 |
| Comparative Example 1 | Ag | fcc Structure | 5 | 16.5 | 4623 | 3.8 | 8.9 |
| Comparative Example 2 | Au | fcc Structure | 5 | 16.7 | 4529 | 4.2 | 8.7 |
| Comparative Example 3 | Cu | fcc Structure | 5 | 16.6 | 4526 | 4.0 | 9.4 |

[Crystal Orientation]

The magnetic recording media were evaluated by observing a rocking curve by using an X-ray diffraction apparatus and measuring a half-value width Δθ50 of the rocking curve.

[Average Crystal Grain Diameter]

The magnetic recording media were observed by a transmission electron microscope (TEM). The average crystal grain diameter was obtained by performing grain diameter analysis of alloy crystal grains having a granular structure in a planar image of the observed magnetic recording layer.

As shown in Table 1, all the seed layers in the perpendicular magnetic recording media of Examples 1 to 9 had a pseudo-hexagonal structure. On the other hand, all the seed layers in the perpendicular magnetic recording media of Comparative Examples 1 to 3 had an fcc structure.

Moreover, as shown in Table 1, it was possible to confirm that the perpendicular magnetic recording media of Examples 1 to 9 have crystal orientation of increased excellence in the magnetic recording layer (have a smaller Δθ50), have a smaller average crystal grain diameter in the magnetic recording layer, and have a higher SNR for the evaluation of the recording and reproducing characteristics than the perpendicular magnetic recording media of Comparative Examples 1 to 3.

In addition, the perpendicular magnetic recording media of Examples 1 to 9 have a lower coercive force Hc than the perpendicular magnetic recording media of Comparative Examples 1 to 3. In general, it is thought that a coercive force Hc is reduced because the crystal grain diameter of the magnetic recording layer is small and an influence of thermal fluctuation is thus easily seen, or because crystal orientation deteriorates and magnetic anisotropy is thus reduced. However, the perpendicular magnetic recording media of Examples 1 to 9 have crystal orientation of increased excellence compared to the perpendicular magnetic recording media of Comparative Examples 1 to 3. Accordingly, it was found that the coercive force was reduced in Examples 1 to 9 because the influence of thermal fluctuation was easily seen.

Examples 10 to 18 and Comparative Examples 4 to 18

A soft magnetic underlayer was formed on a glass substrate in the same manner as in Example 1, and seed layers were formed in the same manner as in Example 1, except that the compositions and film thicknesses shown in Table 2 were employed.

The in-plane X-ray diffraction of the seed layers obtained in this manner was performed and the structures of the seed layers were analyzed. The result thereof is shown in Table 2.

TABLE 2

| Sample | Seed Layer (at %) | Structure of Seed Layer | Film Thickness (nm) | SNR (dB) | Hc (Oe) | Δθ50 (deg.) | Average Crystal Grain Diameter (nm) |
| --- | --- | --- | --- | --- | --- | --- | --- |
| Example 10 | Ag50Cu | Pseudo-hexagonal Structure | 4 | 18.3 | 3884 | 3.4 | 6.2 |
| Example 11 | Ag50Cu | Pseudo-hexagonal Structure | 6 | 18.3 | 3924 | 3.4 | 6.2 |
| Example 12 | Ag50Cu | Pseudo-hexagonal Structure | 8 | 18.2 | 4073 | 3.3 | 6.4 |
| Example 13 | Ag50Au | Pseudo-hexagonal Structure | 4 | 18.2 | 3692 | 3.1 | 5.9 |
| Example 14 | Ag50Au | Pseudo-hexagonal Structure | 6 | 18.1 | 3816 | 3.0 | 6.0 |
| Example 15 | Ag50Au | Pseudo-hexagonal Structure | 8 | 18.0 | 4031 | 2.9 | 6.0 |
| Example 16 | Ag50Cu | Pseudo-hexagonal Structure | 4 | 18.4 | 3982 | 3.2 | 5.9 |
| Example 17 | Ag50Cu | Pseudo-hexagonal Structure | 6 | 18.2 | 4088 | 3.3 | 6.2 |
| Example 18 | Ag50Cu | Pseudo-hexagonal Structure | 8 | 17.9 | 4202 | 3.2 | 6.3 |
| Comparative Example 4 | Ag | fcc Structure | 4 | 16.5 | 4382 | 4.3 | 9.2 |
| Comparative Example 5 | Ag | fcc Structure | 6 | 16.8 | 4589 | 3.8 | 9.4 |
| Comparative Example 6 | Ag | fcc Structure | 8 | 16.4 | 4821 | 3.7 | 10.0 |
| Comparative Example 7 | Au | fcc Structure | 4 | 16.8 | 4209 | 4.8 | 9.3 |
| Comparative Example 8 | Au | fcc Structure | 6 | 17.1 | 4426 | 4.3 | 9.4 |
| Comparative Example 9 | Au | fcc Structure | 8 | 17.0 | 4771 | 4.0 | 9.7 |
| Comparative Example 10 | Cu | fcc Structure | 4 | 17.1 | 4327 | 4.6 | 9.9 |
| Comparative Example 11 | Cu | fcc Structure | 6 | 16.9 | 4508 | 4.2 | 9.9 |
| Comparative Example 12 | Cu | fcc Structure | 8 | 16.4 | 4882 | 4.1 | 10.2 |
| Comparative Example 13 | Ni | fcc Structure | 4 | 16.8 | 4625 | 3.9 | 9.6 |
| Comparative Example 14 | Ni | fcc Structure | 6 | 16.8 | 4827 | 3.8 | 9.8 |
| Comparative Example 15 | Ni | fcc Structure | 8 | 16.0 | 5001 | 3.6 | 9.9 |
| Comparative Example 16 | Ti | hcp Structure | 4 | 14.8 | 3674 | 6.0 | 8.3 |
| Comparative Example 17 | Ti | hcp Structure | 6 | 15.0 | 3892 | 5.6 | 8.6 |
| Comparative Example 18 | Ti | hcp Structure | 8 | 15.3 | 4005 | 5.1 | 9.0 |
| Comparative Example 19 | Ag50Cu | Random | 1 | 7.4 | 2834 | 6.4 | 6.1 |
| Comparative Example 20 | Ag50Cu | Random | 2 | 7.9 | 2650 | 6.1 | 6.1 |

Subsequently, in an Ar atmosphere, an 8-nm thick first intermediate layer made of Ru was formed on the seed layer at a gas pressure of 0.6 Pa by sputtering. After that, in the Ar atmosphere, an 8-nm thick second intermediate layer made of Ru was formed on the first intermediate layer at a gas pressure of 10 Pa by sputtering.

Next, in the Ar atmosphere, a 10-nm thick magnetic recording layer made of 90(Co10Cr15Pt)-10(SiO$_2$) was formed on the second intermediate layer at a gas pressure of 10 Pa by sputtering. After that, a protective layer was formed on the magnetic recording layer in the same manner as in Example 1 and a lubricant was applied thereon. In this manner, a perpendicular magnetic recording medium was manufactured.

In the alloy composition formulas of Examples 10 to 18 and Comparative Examples 4 to 18, double-byte numeric characters attached before each element indicate the ratio (at %) of each element included in the alloy, and the ratio of an element without numeric characters is a remainder of the ratio of another element.

For the perpendicular magnetic recording media of Examples 10 to 18 and Comparative Examples 4 to 18 obtained in this manner, the recording and reproducing characteristics, static magnetic characteristics, crystal orientation of the magnetic recording layer and average crystal grain diameter were evaluated in the same manner as in Example 1. The result thereof is shown in Table 2.

As shown in Table 2, all the seed layers in the perpendicular magnetic recording media of Examples 10 to 18 had a pseudo-hexagonal structure. On the other hand, all the seed layers in the perpendicular magnetic recording media of Comparative Examples 4 to 18 had an fcc structure. The seed layers in the perpendicular magnetic recording media of Comparative Examples 19 and 20 had a random structure.

Moreover, as shown in Table 2, in the case of the perpendicular magnetic recording media of Examples 10 to 18 in which the seed layer has an fcc structure which (111) crystal plane is oriented in a direction perpendicular to a substrate surface and has a pseudo-hexagonal structure, the crystal grain diameter hardly changes even when the film thickness is thick. In addition, it was possible to confirm that the perpendicular magnetic recording media of Examples 10 to 18 have crystal orientation of increased excellence in the magnetic recording layer (have a smaller Δθ50), have a smaller average crystal grain diameter of the magnetic recording layer, and have a higher SNR than the perpendicular magnetic recording media of Comparative Examples 4 to 18 even when a film thickness is thin, for example, 4 nm.

On the other hand, in the case of the perpendicular magnetic recording media of Comparative Examples 4 and 15 in which the seed layer has an fcc structure and the perpendicular magnetic recording media of Comparative Examples 16 to 18 in which the seed layer has an hcp structure, the crystal orientation of the magnetic recording layer is improved (Δθ50 is small) due to the thick film thickness. However, the crystal grain diameter is also significantly increased and thus the SNR is reduced.

The comparative Examples 19 and 20 have a small crystal grain diameter as in Examples 10 to 18. However, the crystal orientation of Ru constituting the first and second intermediate layers is so poor that the coercive force (static magnetic characteristics) and the SNR are low values. The reason for this is that, when Ag50Cu constituting the seed layer is formed in a film thickness of about 4 nm, Ag50Cu has a pseudo-hexagonal system, and when Ag50Cu is formed in a thin film thickness of about 1 to 2 nm, random orientation is obtained instead of fcc (111) crystal orientation and thus the Ag50Cu does not have a pseudo-hexagonal system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A perpendicular magnetic recording medium comprising:
   a non-magnetic substrate; and at least
   a soft magnetic underlayer,
   an orientation control layer,
   a magnetic recording layer and
   a protective layer,
   which are formed on the non-magnetic substrate in order from the bottom,
      wherein the orientation control layer has a laminated structure of two or more layers comprising an intermediate layer and a seed layer which is disposed closer to the non-magnetic substrate than the intermediate layer,
      the seed layer comprises two or more elements having a face-centered cubic structure, the seed layer has face-centered cubic crystal structure which (111) plane is oriented in a direction perpendicular to a substrate surface, and the seed layer has a pseudo-hexagonal structure,
      a film thickness of the seed layer is equal to or greater than 3 nm and equal to or less than 10 nm,
      the seed layer is formed directly on the soft magnetic underlayer, and
      the soft magnetic underlayer has a soft magnetic amorphous structure.

2. The magnetic recording medium according to claim 1, wherein the two or more elements having a face-centered cubic structure are selected from the group consisting of Cu, Ag, Au, Ni, Pd, Pt, Ir, Al, Rh, Pb and Co.

3. The magnetic recording medium according to claim 1, wherein the intermediate layer comprises an alloy layer made of Ru, Re or an alloy thereof and having a hexagonal close-packed structure.

4. The magnetic recording medium according to claim 1, wherein the intermediate layer comprises an alloy layer, which is made of an alloy comprising at least one element selected from elements having an fcc structure as a main component and an element selected from elements having a body-centered cubic structure; and
   the intermediate layer not only has a crystal structure with (111) crystal plane orientation, but also has a layered irregular lattice resulting from the mix of the face-centered cubic structure and the body-centered cubic structure.

5. The magnetic recording medium according to claim 1, wherein the intermediate layer comprises an alloy layer, which is made of an alloy material comprising at least one element selected from elements having an fcc structure as a main component and an element selected from elements having a hexagonal close-packed structure; and the intermediate layer not only has a crystal structure with (111) crystal plane orientation, but also has a layered irregular lattice resulting from the mix of the fcc structure and the hexagonal close-packed structure.

6. The magnetic recording medium according to claim 1, wherein the magnetic recording layer has a granular structure formed of a ferromagnetic crystal grain and a crystal grain boundary of non-magnetic oxide, and the magnetic recording layer comprises a granular layer, the average grain diameter of which is equal to or less than 7.5 nm in a crystal grain diameter analysis by a transmission electron microscope.

7. The magnetic recording medium according to claim 1, wherein the seed layer is made of an alloy comprising Ag and Cu, and the content of Ag is in the range of 30 to 80 at % and the content of Cu is in the range of 20 to 70 at %.

8. The magnetic recording medium according to claim 1, wherein the seed layer is made of an alloy comprising Ag and Au, and the content of Ag is in the range of 20 to 70 at % and the content of Au is in the range of 30 to 80 at %.

9. The magnetic recording medium according to claim 1, wherein the seed layer is made of an alloy comprising Au and Cu, and the content of Au is in the range of 30 to 80 at % and the content of Cu is in the range of 20 to 70 at %.

10. A magnetic recording reproducing apparatus comprising:

magnetic recording medium according to claim 1; and a magnetic head for recording information on the magnetic recording medium and reproducing the information from the magnetic recording medium.

* * * * *